Figure 16:
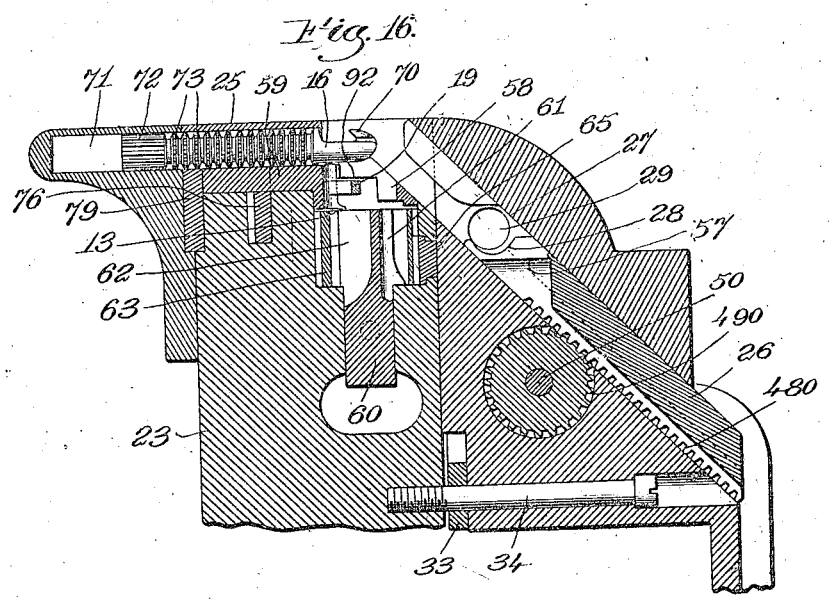

W. B. MATHEWSON.
KNOTTER FOR MATTRESS TUFTING MACHINES.
APPLICATION FILED MAR. 29, 1912.
1,193,708.
Patented Aug. 8, 1916.
8 SHEETS—SHEET 1.
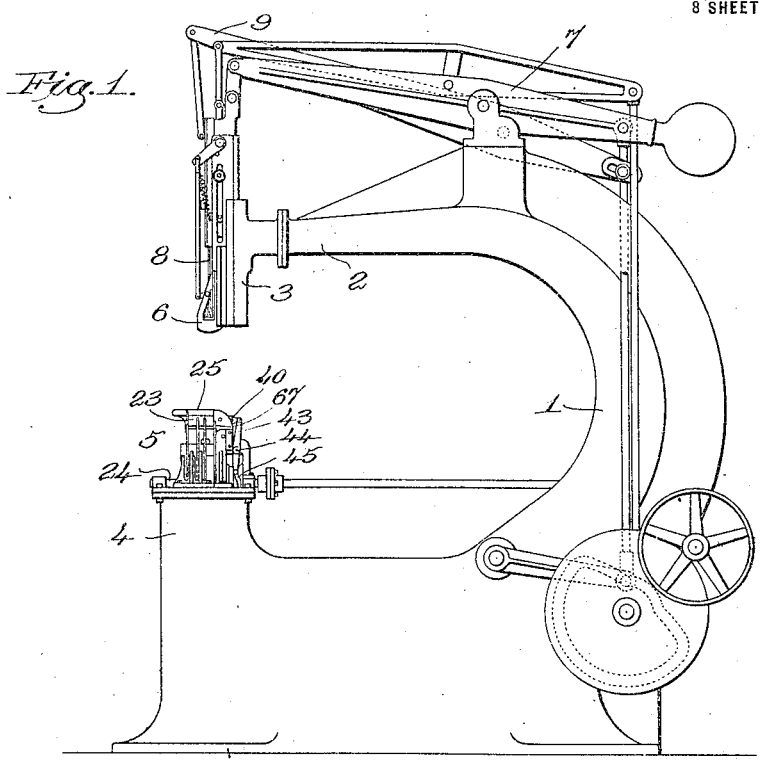
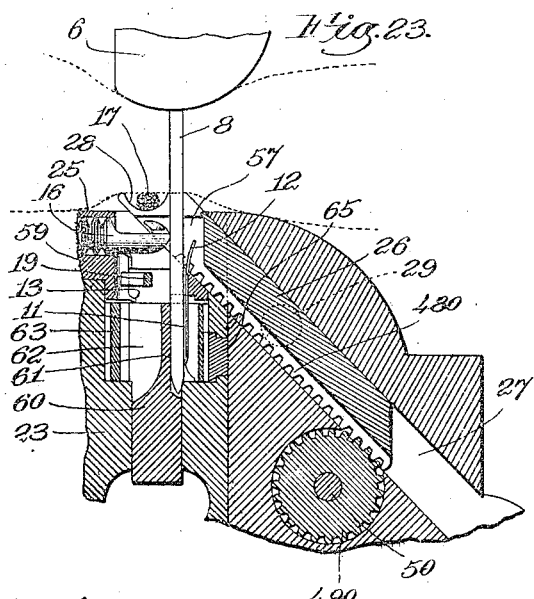
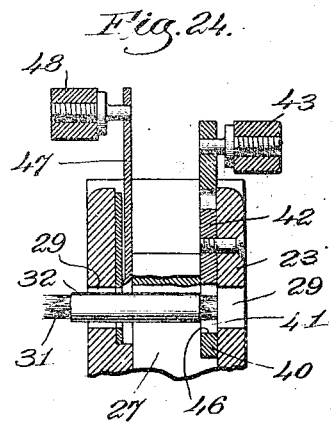
Witnesses.
Inventor.
Wilfred B. Mathewson,

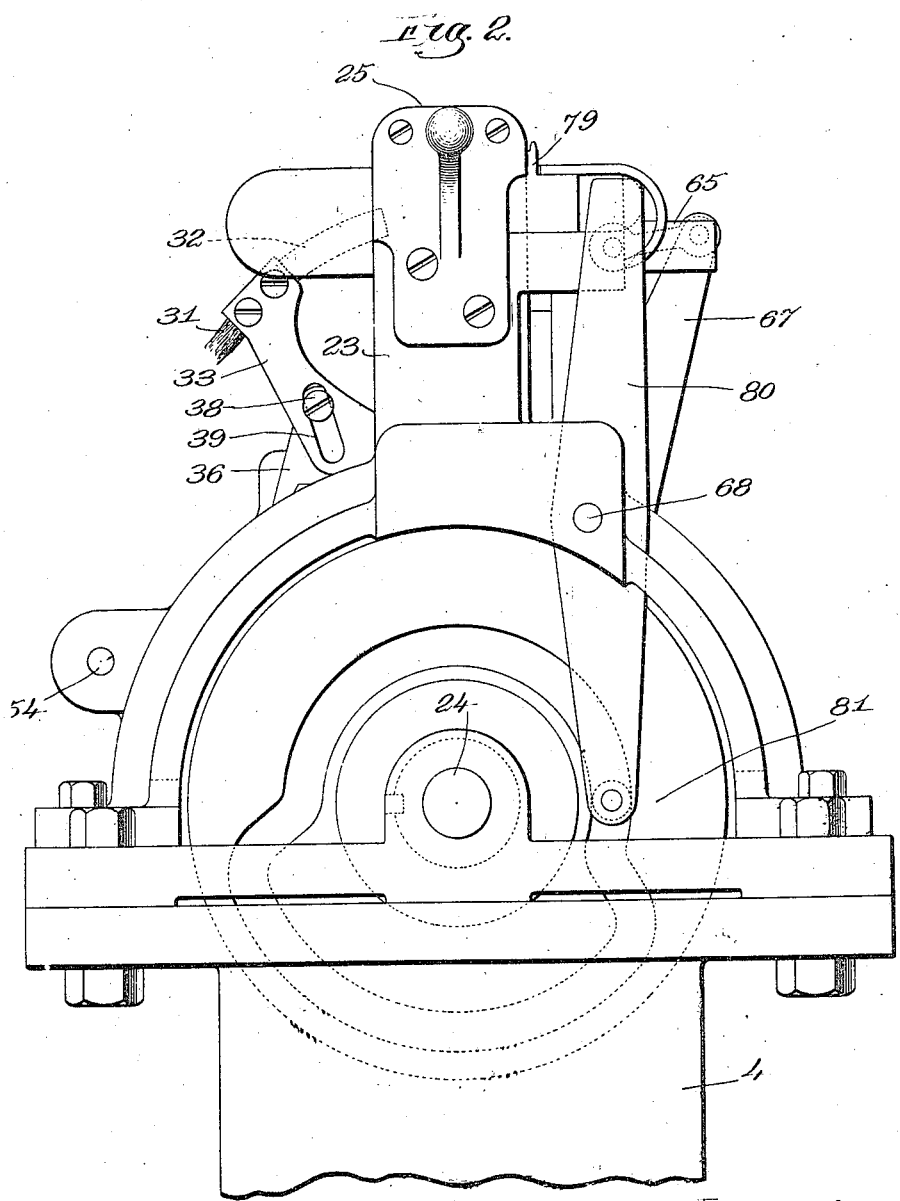

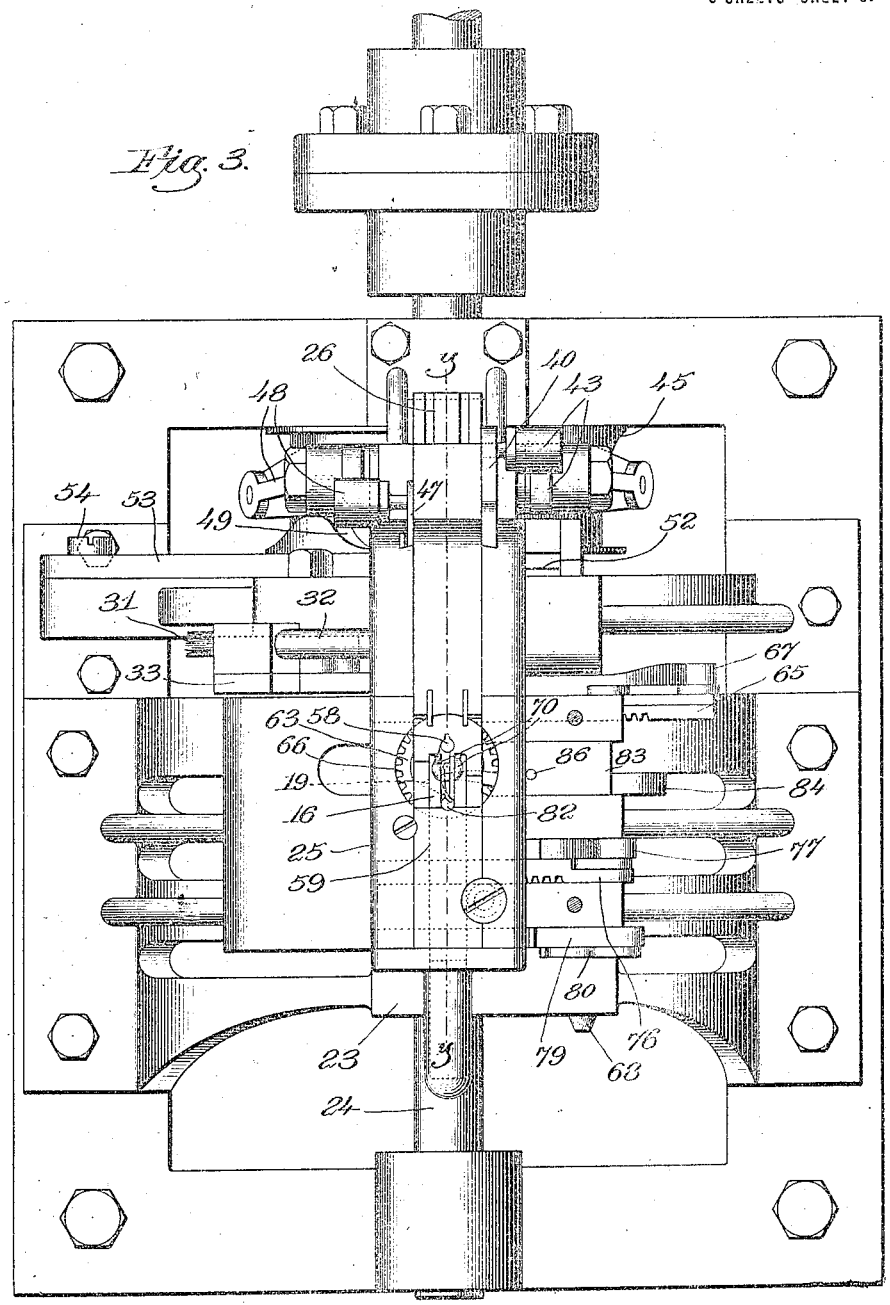

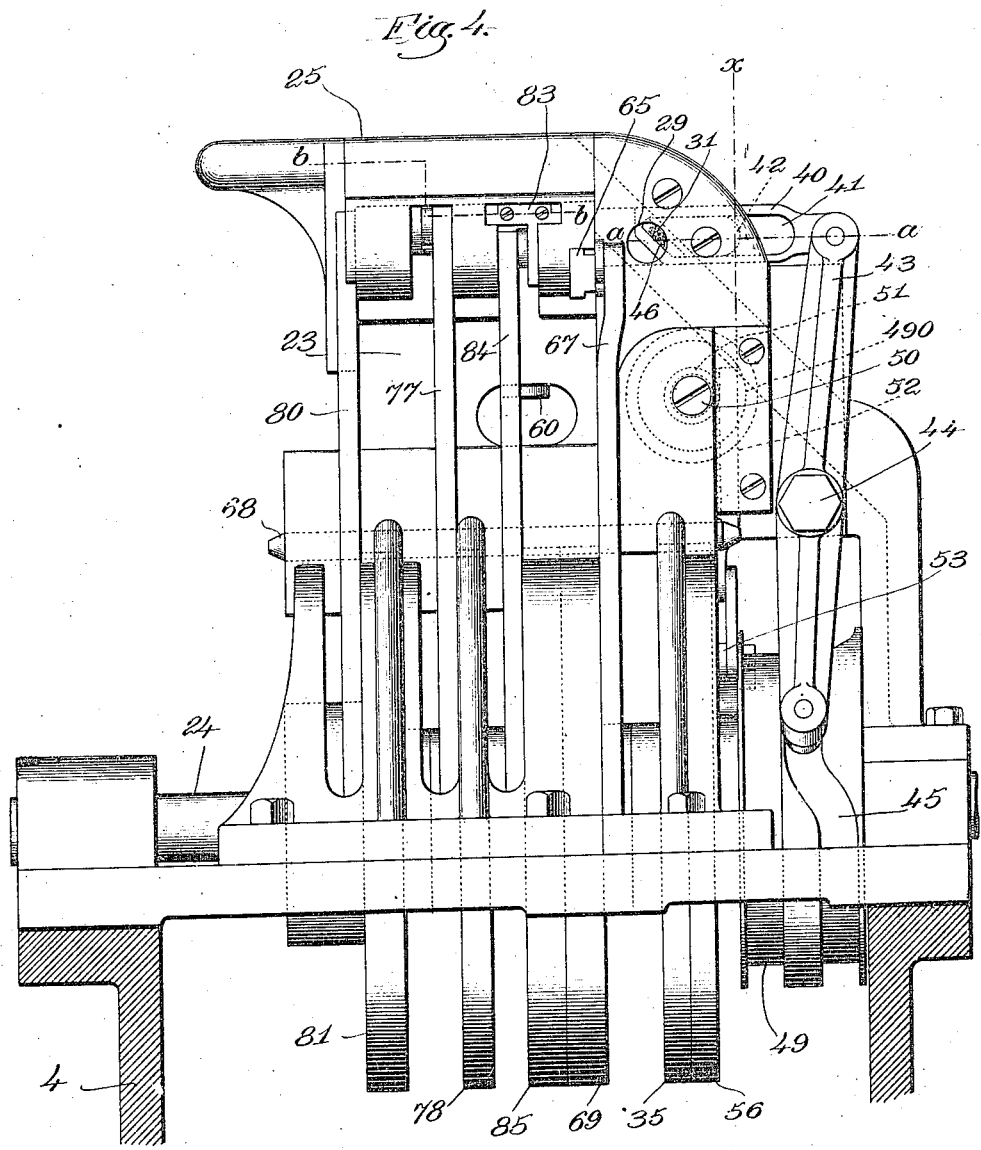

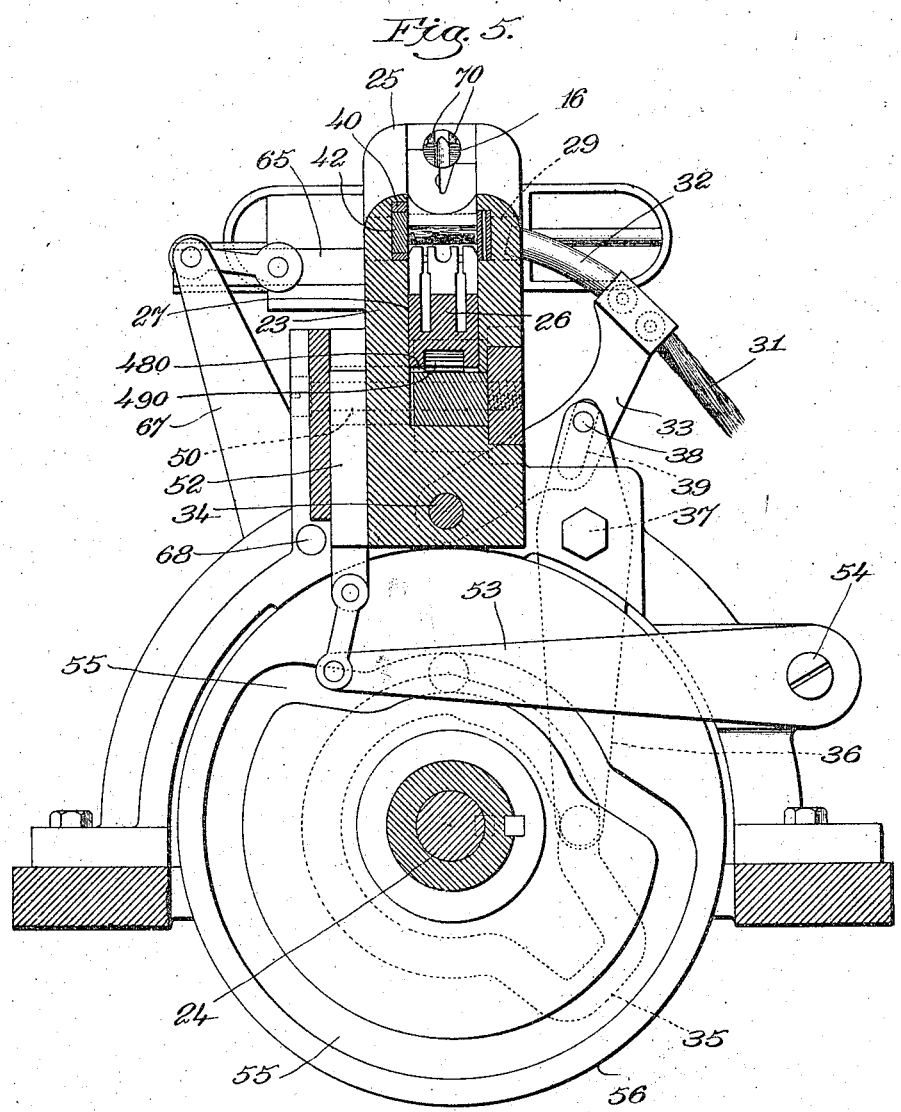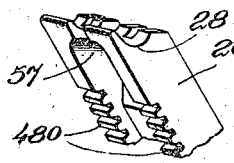

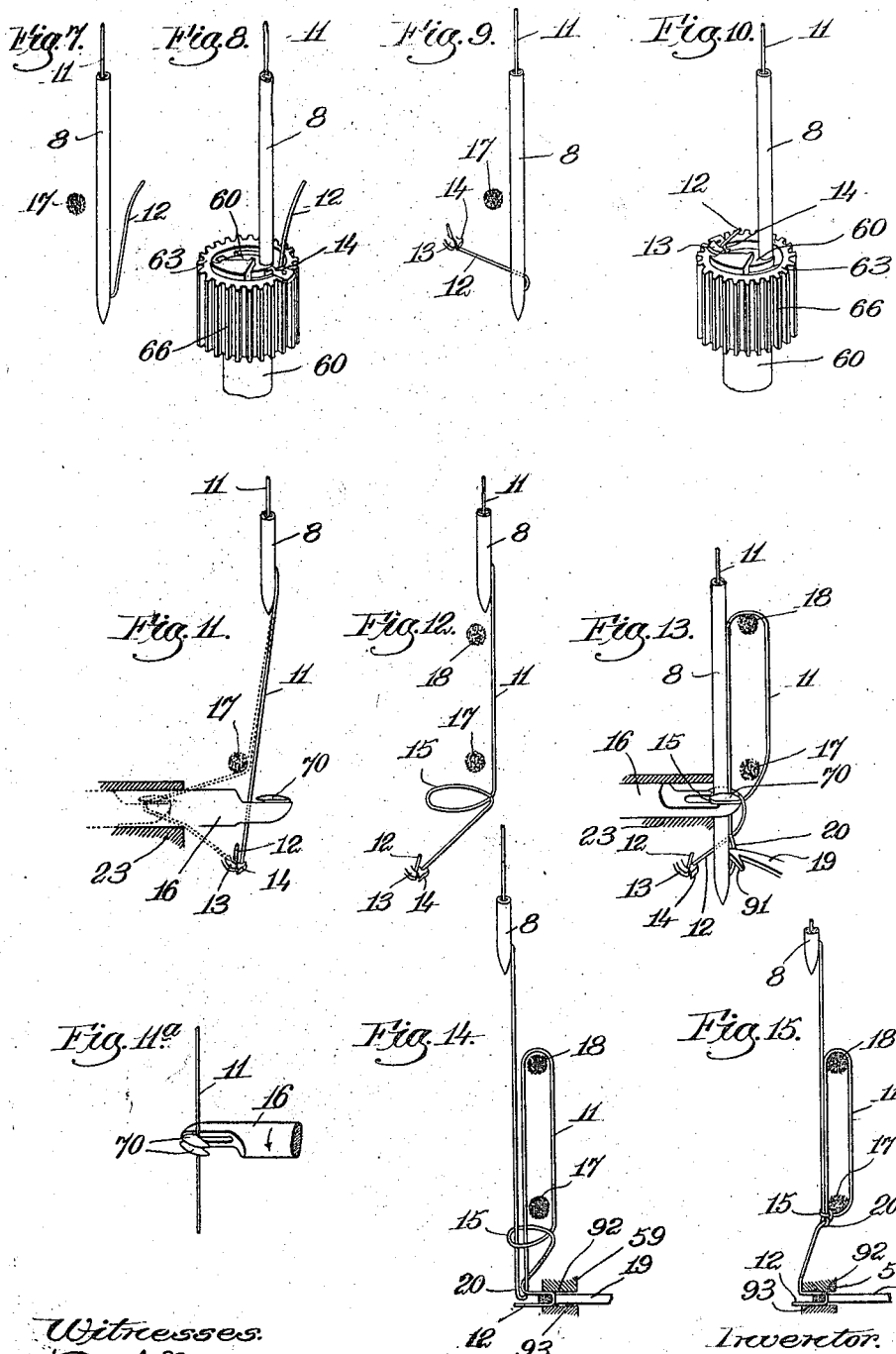

W. B. MATHEWSON.
KNOTTER FOR MATTRESS TUFTING MACHINES.
APPLICATION FILED MAR. 29, 1912.

1,193,708.

Patented Aug. 8, 1916.
8 SHEETS—SHEET 7.

Witnesses:
Thomas J. Drummond
Warren C. Niel

Inventor.
Wilfred B. Mathewson,
by Edwards, Heard & Smith Attys

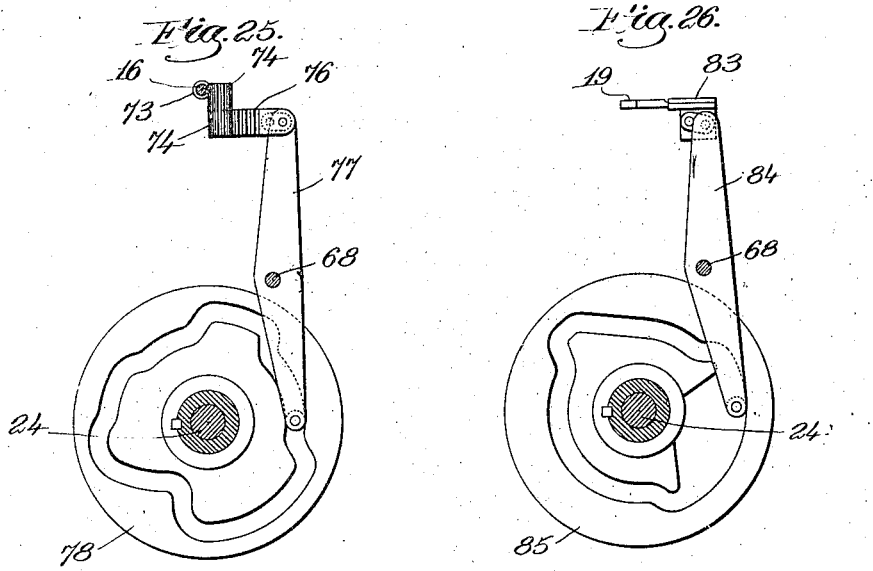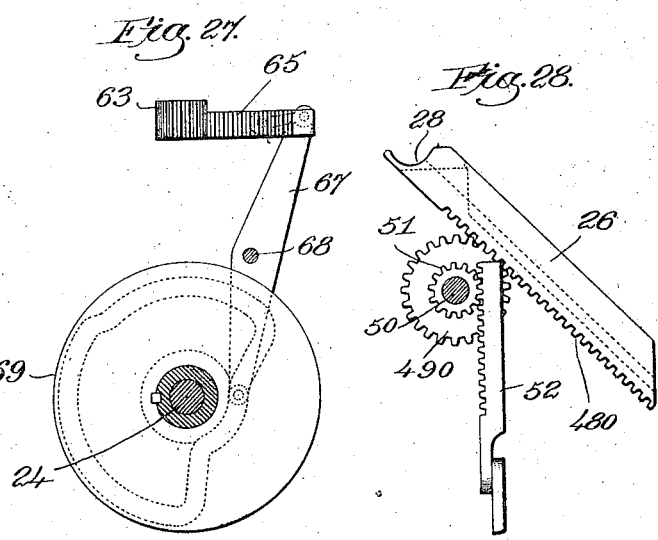

UNITED STATES PATENT OFFICE.

WILFRED B. MATHEWSON, OF NORTH WEYMOUTH, MASSACHUSETTS, ASSIGNOR TO UNITED MATTRESS MACHINERY COMPANY, OF BOSTON, MASSACHUSETTS, A CORPORATION OF MAINE.

KNOTTER FOR MATTRESS-TUFTING MACHINES.

1,193,768.   Specification of Letters Patent.   Patented Aug. 8, 1916.

Application filed March 29, 1912. Serial No. 687,078.

*To all whom it may concern:*

Be it known that I, WILFRED B. MATHEWSON, a citizen of the United States, residing at North Weymouth, county of Norfolk, State of Massachusetts, have invented an Improvement in Knotters for Mattress-Tufting Machines, of which the following description, in connection with the accompanying drawing, is a specification, like characters on the drawing representing like parts.

This invention relates to knotting mechanism for automatically tying a knot in twine, string, thread, etc., and particularly to a knotting mechanism that is especially adapted for use in a mattress-tufting machine for tying knots in the twine that holds the tufts in place, although I desire to state at the outset that the knotter herein shown can be used in other machines than mattress-tufting machines.

The objects of the invention are to provide a knotting mechanism which is simpler and less complicated than those which are now in use, and one having such a construction that the knot can be tied close to the mattress without leaving any slack in the cord or twine, and further to provide a knotter of such a shape that the material of the mattress can be readily compressed to the desired degree at the point where the knot is to be tied, and to otherwise improve knotters, all as will be more fully hereinafter described, and then pointed out in the appended claims.

In the selected embodiment of the invention herein shown, the knotter is illustrated as it would be applied to a tufting machine of the type shown in Patent No. 819,954, May 8, 1906, but I desire to state that the knotting mechanism is not confined in its use to a machine of this type, for by suitable modifications it might be used in other mattress-tufting machines, or might be used in connection with any machine that involves in its operation the tying of a knot in a cord or twine.

Figure 17:
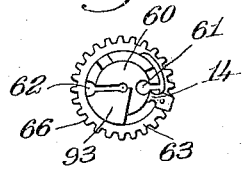
Figure 18:
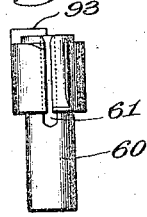
Figure 19:
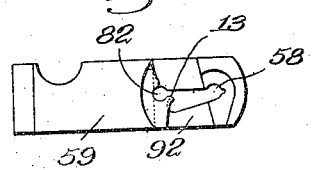
Figure 20:
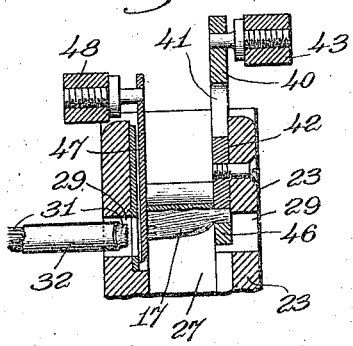
Figure 21:
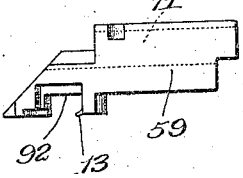
Figure 22:
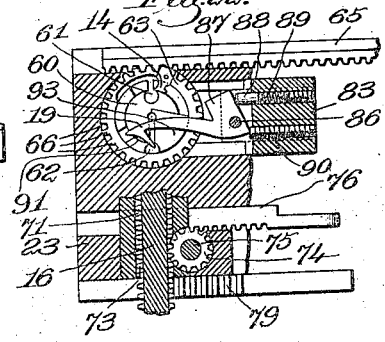

Referring now to the drawings wherein I have illustrated a selected embodiment of my invention for the purpose of disclosing the principle thereof, Figure 1 is a side view of a mattress-tufting machine, such as shown in said Patent No. 819,954 and having my invention applied thereto; Fig. 2 is a front view of the knotter; Fig. 3 is a top plan view thereof; Fig. 4 is a side view; Fig. 5 is a section on the line $x$—$x$, Fig. 4; Fig. 6 is a perspective view of the upper end of the tuft presenter; Figs. 7 to 15 inclusive show more or less diagrammatically the various steps in the operation of forming the knot; Fig. 16 is a section through the knotter on the line $y$—$y$, Fig. 3; Fig. 17 is a top plan view of the gripper; Fig. 18 is a side view of a portion thereof; Fig. 19 is a bottom plan view of the retaining block; Fig. 20 is a section on the line $a$—$a$, Fig. 4; Fig. 21 is a side view of the retaining block; Fig. 22 is a section on substantially the line $b$—$b$, Fig. 4; Fig. 23 is a fragmentary sectional view similar to Fig. 16 but showing the tuft presenter raised; Fig. 24 is a view similar to Fig. 20 but showing the gripper open; Fig. 25 shows the cam and parts for reciprocating the looper; Fig. 26 shows the cam and parts for operating the cross hook; Fig. 27 shows the cam and parts for operating the gripper; Fig. 28 is a fragmentary view showing the means for operating the tuft presenter.

Before describing in detail my improved knotter I will refer briefly to the general mode of operation of the machine in order to make the detailed description of the knotter more easy to understand.

1 designates the frame of the machine shown in Fig. 1 which is roughly shaped like a large letter C. The base 4 of the frame carries at one end the knotter designated generally by 5, and in practice a suitable table or platform will be used in connection with the knotter for supporting the mattress to be tufted, said mattress resting on the table and being sustained above the knotter. To the overhanging arm 2 of the frame is secured a head 3, and this head carries a compressor 6 which is moved vertically by a lever 7 pivoted to the frame and operated in any suitable way. The head 3 also sustains a needle 8 and a lever 9 for operating the needle to cause it to penetrate the mattress and be withdrawn therefrom. Associated with the needle is a needle-guide which operates to position the needle in one of two different positions, all as fully set forth in said Patent No. 819,954.

In the operation of the machine the filled and untufted mattress is laid upon the table or other supporting device below which is the lower stationary compressor head associated with the knotter and above which is the vertically reciprocable upper compressor 6. The table itself is not shown in the drawing as it forms no part of the present invention. When the machine is set in operation the upper compressor 6 is first brought down upon the mattress at the desired point thereby squeezing it between the upper and lower compressors. Simultaneously, a tuft is fed into place on each side of the mattress. The needle 8 is then forced downwardly through the mattress carrying with it the tufting twine and in its descent the needle pierces the mattress and enters the lower compressor head and the knotting mechanism. The knotting mechanism is provided with a gripper which grips the loose end of the twine and the needle then rises, leaving the strand of twine in its path. After the needle is elevated it is moved bodily forwardly in a plane at right angles to its length a sufficient distance to carry the twine across over the upper tuft and the needle then descends carrying the second strand of twine through the mattress parallel to the first strand. During the time that the needle was being elevated and carried forwardly the knotting mechanism has formed a loop in the first strand of twine, and this loop is so placed that when the needle makes its second descent in its forward position it passes through the loop. The end of the twine which has been held by the gripper is then released and is drawn through the loop of twine carried by the needle, and then the needle rises and by drawing backwardly on the thread the knot is formed. Suitable mechanism is employed for cutting the twine after the knot has been formed and then the needle is shifted back to its original position ready for its next operation. The needle thus makes two passes through the mattress in the formation of each knot. This in brief is the cycle of operations of the machine, and since my present invention relates solely to the knotter and not to the mechanism for operating the needle or the compressor, I have not deemed it necessary to further describe the general operation of the machine.

The knot which is tied by my improved knotter is similar to that tied by the knotter shown in Patent No. 819,954. In Figs. 7 to 15 I have illustrated diagrammatically the various steps in the operation of forming the knot, and I will first refer to these briefly before describing in detail the mechanism for accomplishing the desired object.

In Fig. 7 the needle 8 is shown as having made its first descent carrying the twine 11 down through the mattress, the end 12 of the twine being bent back upwardly parallel to the needle by the forcing of the needle through the mattress. This end 12 of the twine is then gripped between two gripping members 13 and 14 and carried around to the left, as shown diagrammatically in Fig. 9. The construction of the gripper, which is shown more in detail in Figs. 8 and 10, will be more fully described hereinafter. After the end 12 of the twine has been thus gripped between the gripping members the needle is withdrawn, as shown in full lines Fig. 11, and a loop 15 is then formed in the first strand of the twine by means of a suitable looper 16, the construction of which will be enlarged upon hereinafter. It should be remarked that the lower tuft 17 is fed into place before the needle makes its first descent. After the needle has been elevated, as shown in Figs. 11 and 12, an upper tuft 18 is fed into place and the needle is carried forwardly so as to carry the twine 11 over the upper tuft 18, and then the needle descends through the loop 15, as shown in Fig. 13, thus carrying a loop 20 of the tufting twine through said loop 15. While the needle is in its lowered position the end 12 of the twine is released by the grippers 13 and 14, and said end is drawn through the loop 20 of twine carried by the needle, this operation being accomplished by means of a cross-hook 19, the construction of which will be elaborated upon hereinafter. When the end 12 of the twine has been drawn through the needle loop 20 of twine the needle is elevated, as shown in Fig. 14, and by drawing on the twine the knot is tightened, as shown in Fig. 15.

The formation of the knot with my invention is accomplished by means of the coöperation of the needle, the gripper, the looper 16, and the cross-hook 19, there being really only three elements aside from the needle. This simplifies very much the construction of the knotter, and, as will be presently described, makes a knotter which will tie the knot without the necessity of providing any slack in the twine.

The lower tuft 17 is fed into place by a tuft presenter, and said tuft presenter, the gripper, the looper and the cross-hook are all sustained by and operated in a head 23 which is suitably supported on the frame, and these parts are all actuated by cams which are carried by a cam shaft 24 that is journaled in said head and is operatively driven by any suitable means.

The upper side 25 of the head 23 constitutes the lower compressor, which coöperates with the upper compressor 6 to compress the portion of the mattress where the tuft is to be tied, as seen in Fig. 23, wherein the mattress is shown in dotted lines. This lower compressor portion of the head is made comparatively narrow so that during the compressing of the mattress it acts on a comparatively small portion of the mattress. This enables the portion of the mattress between the compressors to be more severely compressed than if the lower compressor were of considerable area and consequently acted against a considerable portion of the mattress.

I will first describe the tuft presenter. The tuft presenter is shown at 26 and is in the nature of a block slidably mounted in a slot or way 27 formed in the head 23. Said tuft presenter is formed at its upper end with a transverse tuft-carrying groove 28 which is adapted to engage the tuft 17 and carry it up above the compressor 25, as shown in Fig. 23. The tufts are fed to the tuft presenter through an aperture 29 formed in the head, and in the form of a continuous length 31 of loosely-twisted fibrous material, and means are associated with the tuft presenter for cutting off from this continuous piece the lengths which constitute the separate tufts 17. This continuous length of twisted fibrous material passes into a feeding member 32 in the form of a tube which is sustained by an arm 33 that is pivoted in the head at 34. The arm 33 is moved forwardly to carry the feeding tube 32 into the aperture 29 and the end of the tuft which projects beyond the tube is then engaged by a gripper and the arm 33 then swings backwardly, said gripper operating to draw the length 31 through the tube during such backward movement. The arm 33 is given its oscillating movement by a suitable cam 35 mounted on the shaft 24 and acting on one end of a lever 36 which is pivoted at 37, the other end of said lever carrying a pin 38 which engages in a slot 39 formed in the lever 33. The cam 35 is timed to give the lever 33 its oscillatory movement at the proper point in the cycle of operations.

The tuft gripper which engages the end of the tufting material when the lever 33 is moved forwardly is shown in section in Fig. 20 and in dotted lines in Fig. 4. This gripper comprises a sliding member 40 provided with a slot 41 in which is received a stationary gripping block 42 that is secured to the head 23 inside of the wall of the passage 27 therein. The sliding gripping member 40 is connected to a lever 43 pivotally mounted at 44 and operated by a cam 45 carried by the shaft 24. At the time that the feeding tube 32 swings forwardly the cam 45 has moved the movable gripping member 40 into the position shown in Fig. 24, and when the feeding tube 32 swings forwardly the end of the tufting material carried thereby is carried between the end 46 of the gripping member 40 and the stationary gripping member 42. The member 40 is then moved into the position shown in Figs. 4 and 20 thereby gripping the end of the tufting material between the parts 42 and 46. The tube 32 then swings backwardly into the position shown in Fig. 5, thus causing the tufting material to be drawn through the tube. The tuft 17 is then cut from the material by a knife 47 which is operated by a lever 48 that is actuated by a cam 49, said knife moving inside of the passageway 27, as clearly seen in Fig. 20.

The tuft 17 which is thus severed from the material 31 is situated directly above the tuft-carrying groove 28 in the tuft presenter, so that when the presenter moves upwardly the tuft is carried thereby above the compressor 25 and against the mattress as seen in Fig. 23. This upward movement of the tuft presenter is accomplished by the following mechanism: The under side of the tuft presenter is provided with rack teeth 480 which mesh with a pinion 490 on a shaft 50. This shaft is provided with a pinion 51, the teeth of which mesh with a rack 52 movable vertically in ways in the head 23. The rack is pivotally connected at its lower end to a lever 53 which is pivoted at 54 and is provided with a pin or stud playing in a cam groove 55 in a cam 56 that is carried by the shaft 24, said cam groove being so shaped as to give the proper elevating and lowering movement to the tuft presenter. After the lower tuft 17 has been presented the needle 8 descends, as shown in Figs. 7 and 23, the upper end of the tuft presenter being formed with the passageway 57 for the needle, to permit the needle to pass behind the tuft. When the needle makes its first descent it passes down through the opening 58 in a block 59, that is secured in the upper part of the head, and during this downward movement of the needle the end 12 of the tufting twine is carried through the mattress and into the knotting mechanism. This end 12 is then gripped by a gripping mechanism which will now be described.

The gripper herein shown comprises a stud 60 which is fixedly sustained in the head 23 and is formed with two passageways 61 and 62 for the needle, the needle in its first descent entering the passageway 61. Loosely surrounding the stud 60 is a rotary gripping sleeve 63 which is provided with a gripping finger 14 which overlies the upper end of the stud 60 and is situated at one side of the needle passage 61, as shown in Fig. 17. This gripping sleeve 63 is turned about the stud 60 by suitable mechanism and the gripping finger 14 engages the end 12 of twine and carries said end around against a fixed gripping member 13 carried by the block 59, said end being thus gripped between the finger 14 and fixed member 13. This turning movement of the gripping sleeve 63 is herein accomplished by a rack 65 which extends transversely through the head 23 and meshes with teeth 66 formed on the exterior of said gripping sleeve. The rack is connected to a lever 67 which is pivoted on a pivotal pin 68 carried by the head and is actuated by a suitable cam 69 also mounted on the shaft 24, (see Fig. 27). After the end 12 of the twine has thus been gripped between the members 13 and 14 the needle 8 is elevated and the upper tuft 18 is fed into place by a mechanism such as described in said Patent No. 819,954. After the needle is elevated the horizontal loop 15 is formed in the twine that is situated between the gripper 13, 14 and the mattress. This loop is formed by the looper 16 which will now be described. Said looper is formed at its forward end with two hook-shaped fingers 70 which are spaced apart sufficiently to receive the needle 8 between them. In order to form the loop, the hook-shaped fingers are moved forwardly past the twine 11 and the looper is turned so that the hook-shaped fingers stand horizontally, as seen in Fig. 11ᵃ. The hook is then withdrawn into the passage 71 and the fingers engage the twine and pull a bight of it into said passage, as seen in dotted lines, Fig. 11. The looper is then turned on its axis through about three-quarters of a revolution in the direction of the arrow Fig. 11ᵃ to carry the fingers around underneath the looper and up onto the upper side thereof into the position shown in Fig. 13, and in making this turn the horizontal loop 15 is formed in the twine, it being understood that the loop is formed in the passageway 71. The looper 16 then moves forwardly carrying with it the loop 15 which is held on the fingers 70 into position to be penetrated by the needle 8 in its next descent. The looper 16, therefore, has two movements, a reciprocating movement and a turning movement on its axis. The looper is mounted to reciprocate in the recess or passage 71 formed in the head 23, and in order to secure the two movements of the looper, I form the shank thereof with gear teeth 72 which run longitudinally thereof and also with other teeth 73 which extend circumferentially thereof. The gear teeth 73 mesh with a vertically-arranged pinion 74 loosely mounted on a stud 75 carried by the head 23, see Fig. 22, and this pinion has engagement with a rack 76 which reciprocates transversely of the head. The rack 76 is pivotally connected to a lever 77 also pivoted to the pivotal pin 68 and actuated by a cam 78 mounted on the shaft 24. The rotation of the pinion 74 moves the looper longitudinally and the cam 78 is so shaped and timed as to give the looper its reciprocating movement at proper time intervals. The longitudinal gear teeth 72 mesh with the teeth of a transverse rack 79 which is connected to a lever 80 also pivoted on the pivotal pin 68 and operated by a cam 81. Since the teeth 72 extend longitudinally of the looper, said teeth will have operative engagement with the rack 79 in any position of the looper, and since the teeth 73 extend circumferentially of the looper the pinion 74 will have operative engagement therewith in any position of the looper about its axis. The mechanism thus described operates to advance the looper at the proper time and turn the looper on its axis so that the fingers 70 thereof will engage the twine 11 after the needle has been elevated. The looper is then retracted into the dotted line position, Fig. 11, and is turned about its axis to form the horizontal loop 15. After the loop 15 has thus been formed the needle is moved forwardly bodily, as described in said Patent No. 819,954, and then descends through the loop 15, as shown in Fig. 13, between the fingers 70 and into the needle passage 62, said needle at this time passing through the opening 82 in the block 59. It will be understood, of course, that when the needle is carried forwardly before its second descent the twine 11 is carried over the upper tuft 18 which has been previously presented by mechanism carried by the head 3 and which may be similar to that shown in Patent No. 819,954.

After the needle has made its second descent, as shown in Fig. 13, the end 12 of the twine is drawn through the loop of twine carried by the needle by means of the cross hook 19. This cross hook is situated above the gripper and is carried by a reciprocating block 83 that is connected to and operated by a lever 84 that is pivoted on the pivotal pin 68 and is actuated by a cam 85 mounted on the shaft 24. The hook is pivoted to the block at 86 and is provided with a foot 87 which is acted upon by a plunger 88 that is backed by a spring 89, said spring and plunger yieldingly holding the hook in a position determined by the adjustable stop 90. This cross hook is so positioned and shaped that when the block 83 moves forwardly after the needle makes its second descent the point of the hook enters between the twine 11 and the needle, as shown in Fig. 13, and during this time the curved portion 91 of the hook is forced yieldingly against the needle by the spring 89. The cross hook is advanced far enough so as to engage the end 12 of the twine and as this end is grasped by said cross hook it is released by the grippers 13 and 14. The cross hook is then retracted so as to draw the end 12 of the twine through the loop of twine carried by the needle and the retracting movement of this cross hook carries said end of the twine between the surface 92 of the block 59 and the extension 93 formed on the upper side of the stud 60, as shown clearly in Fig. 14. The end 12 of the twine after having been drawn through the loop 20 of the needle twine is thus firmly gripped between the cross hook and the surfaces 92, 93. The needle is then elevated, as shown in Fig. 14 and the combined action of the needle drawing on the twine and of the cross hook in holding the end 12 serves to tighten the knot, as shown in Fig. 15.

The narrow shape of the compressor 25 permits the portion of the mattress between the compressors to be more closely compressed than is possible with the construction shown in Patent No. 819,954, and my improved knotting mechanism is such as to tie the knot close up to the compressed mattress and with practically no slack therein. As a result, when the knot is tied the mattress cannot expand to any appreciable extent and the tufting operation is more satisfactorily done than is possible where the knot can only be tied by providing a certain amount of slack. Furthermore, it will be seen that with my mechanism the knot is tied by the coöperation of three principal elements in addition to the needle, and these elements are arranged so that they can be rapidly operated.

I regard the manner in which the gripper operates as one of the important features of my invention. It will be noted that after the needle has been thrust through the mattress the gripping finger 14 takes the end 12 of the thread and carries it around the needle to one side thereof where it is firmly held between the two members 13 and 14 until the knot is formed. This manner of holding the end of the twine together with the manner in which the looper operates serves to provide for tying the knot rapidly and accurately and with the use of a minimum number of parts.

While I have illustrated herein the preferred construction of my invention, yet I wish it understood that the invention is not limited to the constructional details shown and that consequently various changes may be made in the parts without departing from the invention.

Having fully described my invention, what I claim as new and desire to secure by Letters Patent is:—

1. In a knotter, the combination with a gripper device to grip and hold momentarily the end of a length of twine leading from a source of supply, of a looper, means to give the looper a reciprocatory motion in a direction transverse to the direction of the length of twine to cause it to engage said length of twine at a distance from its end and an oscillatory motion to cause it to form a loop in said twine, means to insert a second loop of twine through the first mentioned loop and means to draw the loose end of the twine through said second loop when said end is released by the gripper.

2. In a knotter, the combination with a reciprocating needle to present a length of twine having a loose end, of a gripper to grip the end of the twine when the needle is lowered whereby a length of twine is drawn off during the upward movement of the needle, an oscillatory, reciprocatory looper to engage the length of twine and form a loop therein, said needle upon its next downward movement carrying a second loop through the first-mentioned loop, and means to draw the loose end of the twine through said second loop.

3. In a knotter, the combination with a gripper device to grip and hold momentarily the end of a length of twine leading from a source of supply, of a looper, means to reciprocate the looper to cause it to engage said twine at a distance from the end and draw the twine laterally to form a bend therein, means acting on the looper to turn it on its axis thereby to form a loop in the twine, means to insert a second loop through the first-mentioned loop, means to open the gripper device to release the loose end and means to draw said loose end through said second loop.

4. In a knotter, the combination with means to present a length of twine having a loose end, of a looper having a shank provided with one set of gear teeth extending longitudinally thereof and another set of gear teeth extending circumferentially thereof, a rack meshing with the first-mentioned teeth and adapted to rotate the looper on its axis, a pinion meshing with the circumferential teeth and adapted to move the looper longitudinally whereby said looper engages the length of twine and forms a loop therein, means to insert a second loop through the loop thus formed, and means to draw the loose end through said second loop.

5. In a knotter, the combination with a twine-carrying needle and means to vibrate it, of means to grip the end of the twine carried by said needle and cause a length of twine to be drawn off therefrom as the needle is retracted, a looper, means to reciprocate said looper in a direction transverse to the direction of movement of the twine-carrying needle to cause it to engage the twine and draw it laterally and then to turn said looper on its axis to form a loop in said length, said needle-operating means causing the needle to insert a second loop through the loop thus formed, and means to draw the end of the twine through said second loop.

6. In a knotter, the combination with a twine-carrying needle, of means to draw off a length of twine therefrom, a looper having two hooked fingers, means to actuate the looper to cause the fingers to engage said length of twine and then to turn thereby to form a loop therein and to present said fingers in a plane at right angles to the needle path, means to carry the needle down between said fingers and through said loop thereby to carry a second loop through said first-named loop, and means to draw the end of the twine through said second loop.

7. In a knotter, the combination with a reciprocating needle, of a gripper comprising a fixed gripping member and an oscillatory gripping member movable in a curved path about the needle when the latter is in lowered position thereby to engage the loose end of the twine and carry it against the fixed gripping member, upward movement of the needle operating to draw off a length of twine, means to form a loop in said length, the second downward movement of the needle operating to insert a second loop through the first-named loop, and means to draw the end of the twine through said second loop.

8. In a knotter, the combination with a reciprocating needle, of a gripper comprising a block having a fixed gripping member associated therewith and a needle passage, a rotatable sleeve carrying a movable gripping finger to engage the loose end of twine carried by the needle and clamp it against the fixed gripping member, upward movement of the needle operating to draw off a length of twine, means to form a loop in said length, means to insert a second loop therethrough and to draw the end of the twine through said second loop.

9. In a mattress-tufting machine, the combination with a reciprocating twine-carrying needle, of a gripper comprising a fixed block having a needle passage and a fixed gripping member, a rotatable toothed sleeve, a movable gripping finger carried by said sleeve and movable adjacent to the needle passage thereby to engage the loose end of twine and clamp it against the fixed gripping member, upward movement of the needle operating to draw off a length of twine, a looper situated above the gripper and adapted to form a loop in said length, the second downward stroke of the needle carrying a second loop through said first-named loop, and means to draw the end of the twine through said second loop.

10. In a mattress-tufting machine, the combination with a reciprocating needle, of a gripper comprising a fixed block having two needle passages and a gripping member, a toothed sleeve carrying a gripping finger, said needle upon its first descent entering one of said needle passages, means to rotate said sleeve thereby to clamp the end of the twine against the fixed gripping member, means to form a loop for the twine which is drawn off as the needle is elevated, means to cause the needle in its second descent to penetrate said loop and enter the second needle passage, and means to draw the end of the thread through the second loop so formed.

11. In a mattress-tufting machine, the combination with means to present a length of twine having a loose end, of a gripper to grip said loose end, a single reciprocatory and oscillatory loop-forming element to form a loop in said length, means to insert a second loop through the loop thus formed, and a cross hook to draw the loose end of the twine through said second loop.

In testimony whereof, I have signed my name to this specification, in the presence of two subscribing witnesses.

WILFRED B. MATHEWSON.

Witnesses:
ALICE G. NIXON,
THOMAS J. DRUMMOND.